UNITED STATES PATENT OFFICE.

FRANK DIBBEN, OF SAN FRANCISCO, ASSIGNOR OF ONE-HALF TO EDGAR J. DUBBS, OF ALAMEDA, CALIFORNIA.

MANUFACTURE OF SUPERPHOSPHATE.

SPECIFICATION forming part of Letters Patent No. 322,698, dated July 21, 1885.

Application filed July 26, 1884. (No specimens.)

*To all whom it may concern:*

Be it known that I, FRANK DIBBEN, of the city and county of San Francisco, and State of California, have invented an Improvement in the Manufacture of Superphosphate or Soluble Phosphate of Lime; and I hereby declare the following to be a full, clear, and exact description thereof.

My invention relates to a new and useful improvement in the manufacture of superphosphate or soluble phosphate of lime; and it consists in dissolving acid sulphate of soda in water, and adding to the solution a certain quantity of pulverized bone or other phosphate of lime, and then driving off the water from the solution by means of heat, all of which I shall hereinafter fully explain.

The object of my invention is to utilize the acid sulphate of soda in the manufacture of superphosphate of lime. This acid sulphate has heretofore been waste product, and by utilizing it in the manner I shall describe I am enabled to manufacture superphosphate of lime at a very reduced cost and in a simple manner.

The manufacture of superphosphate of lime has heretofore, generally, been accomplished by means of the sulphuric acid of commerce. By my process I obtain the necessary sulphuric acid from the acid sulphate of soda. The process is as follows: Acid sulphate of soda is dissolved in water of about 130° Fahrenheit. I use about four parts of water to one of the acid of sulphate. This will decompose the salt, and by allowing it to stand, say, about a week, most of the soda will crystallize as a neutral sulphate. The mother-liquor thus formed is now drawn off. One-half of the sulphuric acid originally in the acid sulphate will remain in the mother-liquor. There will also remain a small proportion of sulphate of soda. To the mother-liquor is now added pulverized bone or any other phosphate of lime, using about one pound of bone or the phosphate of lime to three and a half pounds mother-liquor. Heat is then applied until the surplus water is evaporated.

By this method I induce prompt and full action of the sulphuric acid, and leave phosphoric acid in a soluble condition. In some cases where it may not be desirable to crystallize the neutral sulphate from the mother-liquor, I simply dissolve the acid sulphate of soda in water at 212° Fahrenheit, using one part of water and one part of acid sulphate; then add one part of crushed bones or other phosphate of lime, and apply heat until the surplus water is evaporated. The only difference between this case and the one preceding is that in the latter the soda in the original acid sulphate will remain with the lime as a neutral or basic sulphate. Its presence in the result makes but little difference in the character of the superphosphate of lime as far as its use as a fertilizer is concerned.

I am aware that the bisulphates of the alkalies have been employed in the manufacture of superphosphates, and I do not, therefore, broadly claim such as my invention.

Having thus described my invention, what I claim as new, and desire to secure by Letters Patent, is—

The improvement in the manufacture of superphosphate or soluble phosphate of lime, consisting in dissolving one part of acid sulphate soda in about four parts of water at a temperature at 130° Fahrenheit, in allowing it to stand until the neutral sulphate is crystallized out of the mother-liquor, then in adding about three and a half pounds of the mother-liquor to one pound of the phosphate of lime, and in heating the solution until the surplus water is evaporated, substantially as herein described.

In witness whereof I have hereunto set my hand.

FRANK DIBBEN.

Witnesses:
S. H. NOURSE,
H. C. LEE.